Patented Apr. 10, 1923.

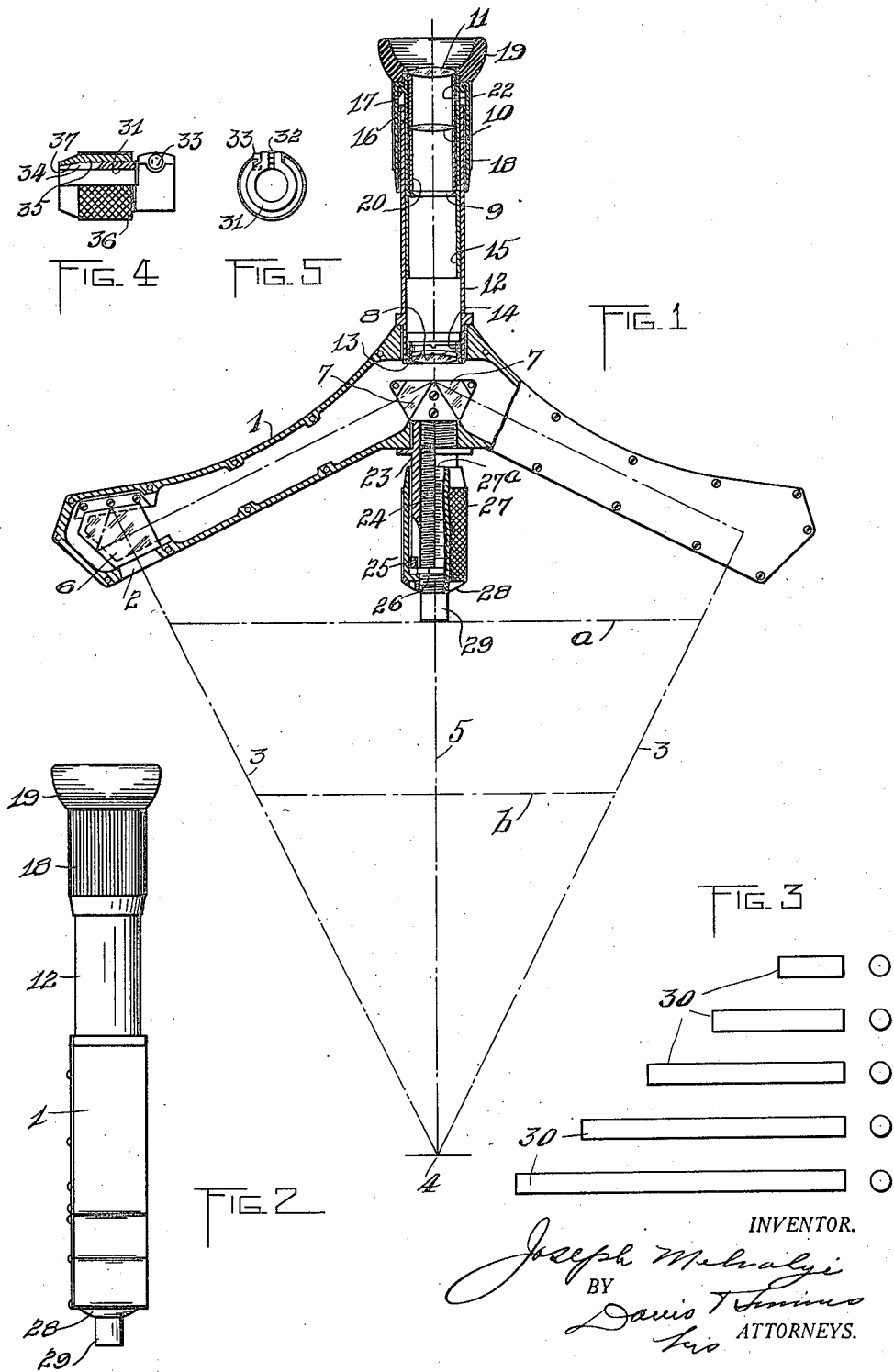

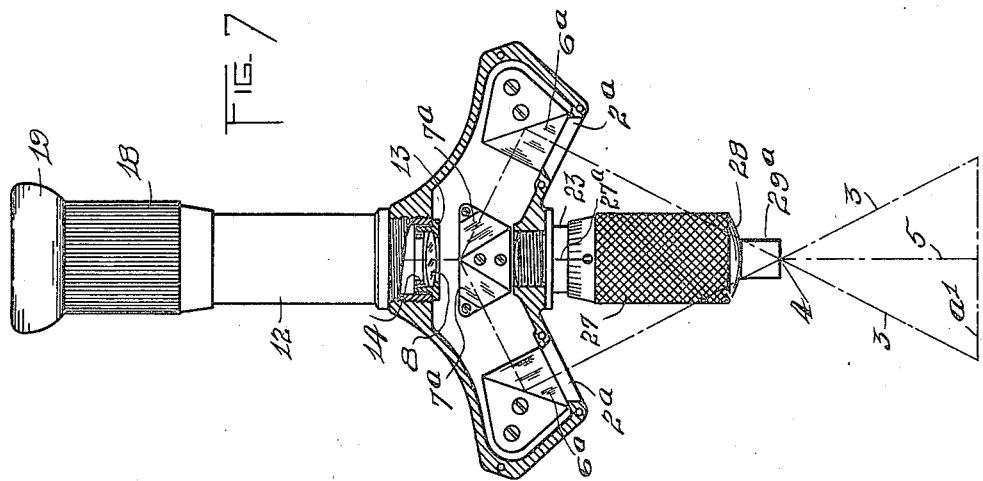

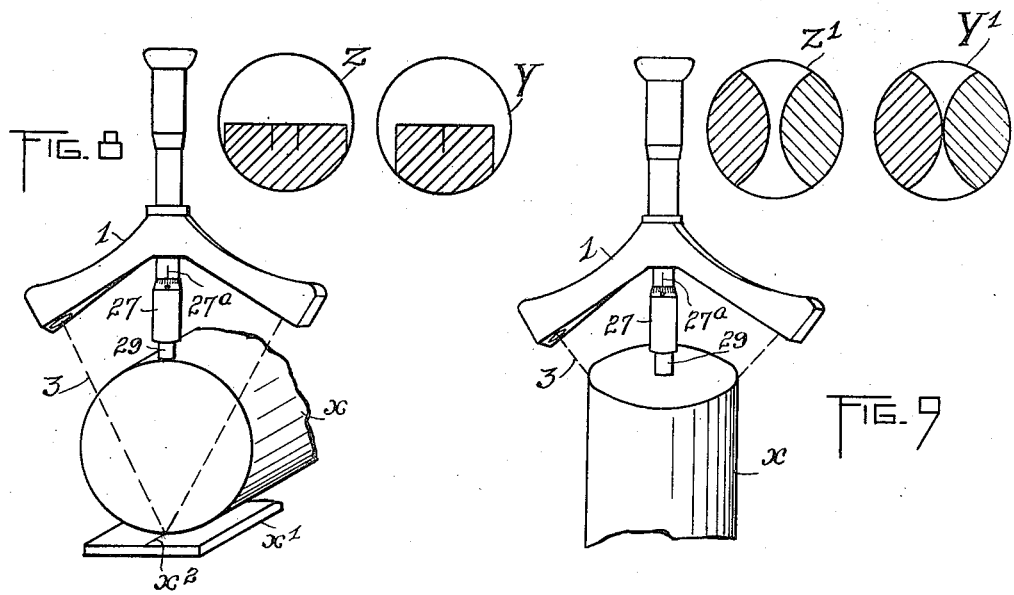
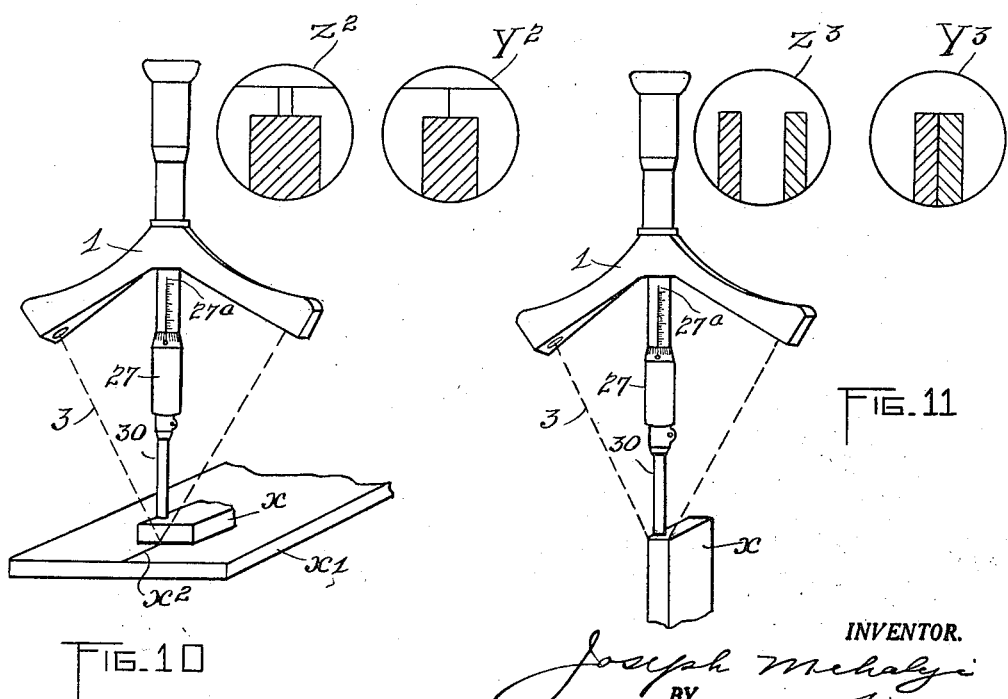

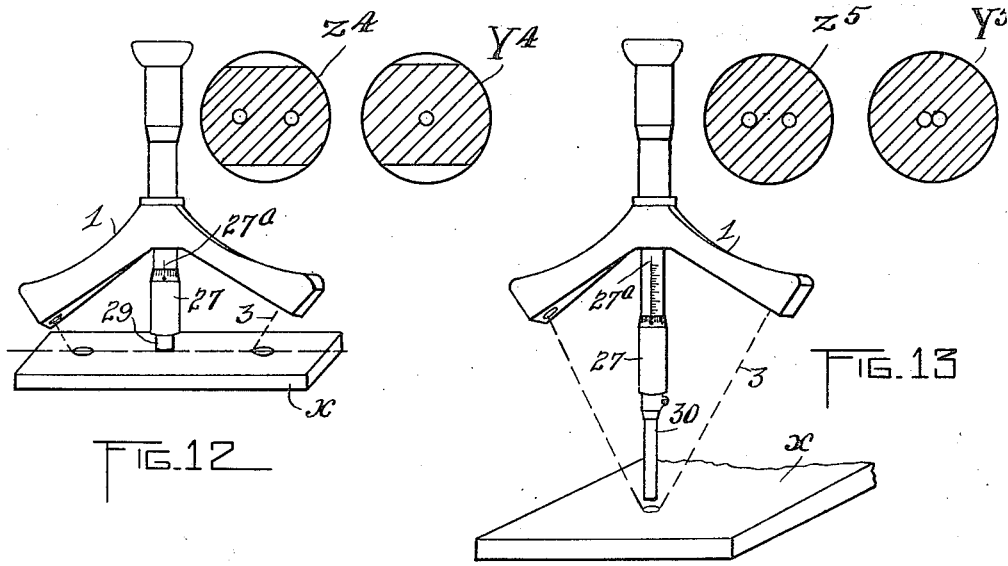
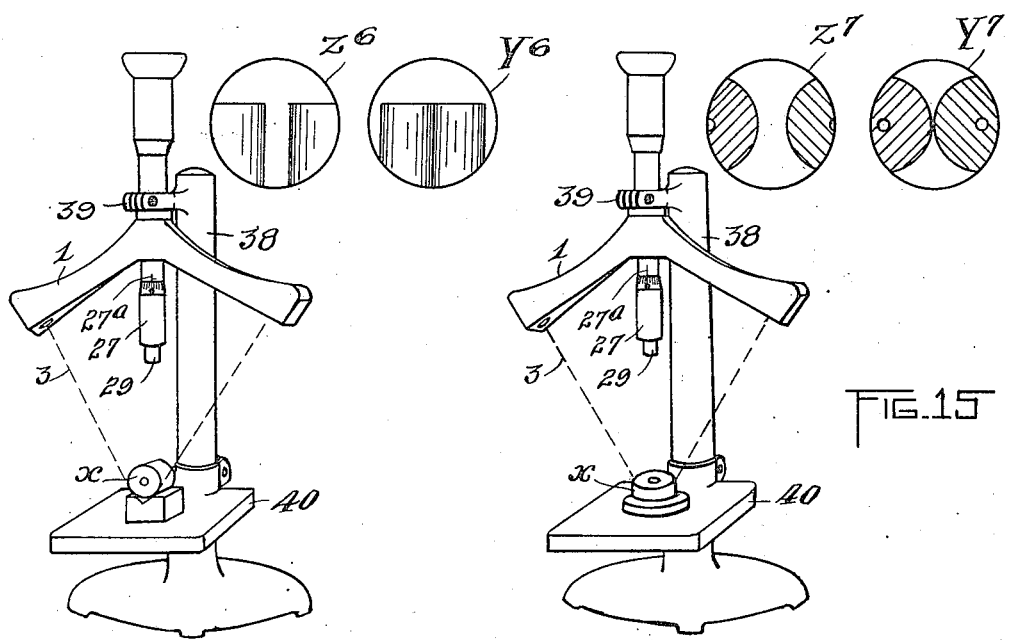

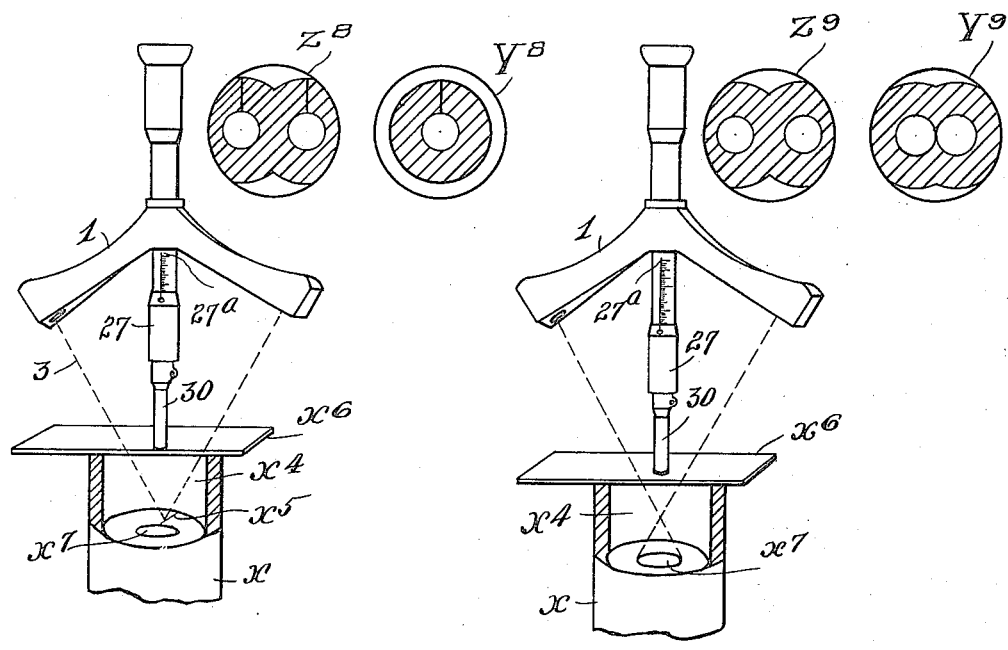

1,451,302

UNITED STATES PATENT OFFICE.

JOSEPH MIHALYI, OF WASHINGTON, DISTRICT OF COLUMBIA.

OPTICAL TESTING AND MEASURING INSTRUMENT.

Application filed May 11, 1920. Serial No. 380,596.

*To all whom it may concern:*

Be it known that I, JOSEPH MIHALYI, a citizen of the United States, and resident of Washington, in the District of Columbia, have invented certain new and useful Improvements in Optical Testing and Measuring Instruments, of which the following is a specification.

The present invention relates to an optical testing and measuring instrument, and an object thereof is to provide instruments for use by manufacturing concerns, machinists, tool makers and others, so that by simple optical means an object can be tested or measured to determine whether or not it is accurately made.

To this and other ends the invention consists of certain parts and combinations of parts, all of which will be hereinafter described, the novel features being pointed out in the appended claims.

In the drawings:

Fig. 1 is a view partially in section showing an instrument constructed in accordance with the present invention;

Fig. 2 is a side view of the instrument;

Fig. 3 is a detail view of a number of extension rods used in connection with the instrument;

Fig. 4 is a partial sectional view of the chuck;

Fig. 5 is an end view of the chuck;

Fig. 6 shows diagrammatically the optical parts of the instrument;

Fig. 7 is a side view partially in section of another embodiment of the invention;

Fig. 8 shows the use of the instrument for measuring the thickness of a piece of round stock from one side;

Fig. 9 shows the adjustment of the instrument for measuring the diameter of a piece of round stock from one end;

Fig. 10 is a view showing the manner of measuring the thickness of a piece of flat stock from one side;

Fig. 11 is a view showing the manner of measuring the thickness of a piece of flat stock from one end;

Fig. 12 is a view showing the manner of measuring the distance between two openings in a piece of material;

Fig. 13 is a view of the manner of measuring the diameter of an opening in a piece of material;

Fig. 14 shows the instrument adjusted for testing the thickness of a piece of round stock;

Fig. 15 shows the instrument adjusted for testing the thickness of a piece of round stock;

Fig. 16 shows the instrument adjusted for measuring the depth of a hole in the end of a rod; and Fig. 17 shows another manner in which the hole in the end of a rod may be measured.

According to this invention, an optical instrument is provided which has two view openings, the optical axes of which are arranged to intersect at the focal point of the instrument to form two equal angles on each side of the focal point, these angles being such that a base line connecting the two sides of either angle at any distance from the focal point of the instrument and at right angles to the perpendicular of the triangle thus formed will have a length equal to such perpendicular. The object is situated at such a distance from the view openings that the part thereof to be measured or tested will equal in length the base line or the perpendicular of a triangle the sides of which are formed by the optical axes of the two view openings and, in this position, the collector will bring into coincidence a certain point present in both images. Should such point not be in coincidence, then the object is inaccurate and the amount of the relative movement between the instrument and the object necessary to bring this point in coincidence determines this inaccuracy.

In the embodiment of the invention illustrated in Figs. 1 to 5, the instrument comprises a chambered base 1 formed with two view openings 2 at opposite ends thereof, the optical axes 3 of these openings being arranged to intersect at the focal point of the instrument to form two angles which are such that a base line such as $a$ or $b$, at any distance from the focal point 4 and at right angles to the perpendicular 5 will have a length equal to the perpendicular of the triangle thus formed. In this embodiment at each view opening, a five sided or pentaprism 6 is rigidly mounted to collect the image and to direct it to a collecting means preferably in the form of two trapeze prisms 7 which bring into coincidence two images of a point located at the focal point of the instrument. Associated with the collecting means is a telescope preferably comprising in this instance an objective 8 arranged in proximity to the trapeze prisms 7, a diaphragm 9, a collective lens 10 and an eye lens 11, the lenses being mounted in suitable mounts which are arranged in the main tube 12 of the telescope. The area of the objective 8 is equal to the opposed faces of the trapeze prisms 7 which allow both images received from the penta-prisms to be projected by the objective lens to the focal plane of such lens with both images appearing next to each other.

The telescope construction in this form comprises the main or outside tube 12 externally threaded and engaging at its lower end the chambered base 1. The lower end of this tube is also threaded internally to receive the mount 13, the objective being held in the mount by a retaining ring 14. At its upper end the outside tube 12 is bored to produce a smooth fit for a focusing sleeve 15 which is provided with a spiral slot in the usual manner to receive a socket screw 16 at the top of the outside tube 12. The rotation of the focusing sleeve 15 will produce a movement which is used for focusing the image. On the focusing sleeve 15 a flange 17 is formed which acts as a stop for cooperating with the upper end of the outside tube 12 to limit the inward movement of the focusing sleeve 15. A focusing ring 18 is mounted on the focusing sleeve 15 and depends about the outside tube 12 and above the focusing ring an eye guard 19 has screw threaded engagement with the focusing sleeve and serves to hold the eye lens 11 to the upper end of the focusing sleeve. The diaphragm 20 is formed within the focusing sleeve 15 and in this instance is in the form of an internal annular flange, said diaphragm being placed directly in the focal plane of the eye piece combination and giving a circular form to the ocular field. A tubular part 20 rests against the diaphragm 9 and serves to support at its upper end, the collective lens 10, such lens being held in place by a second sleeve 22 which forms a support at its upper end for the ocular lens 11.

It is preferred to employ in connection with the instrument a measuring means to be used for determining the amount of inaccuracy in a piece of work. This measuring means is preferably adjustable in the direction of the perpendicular of the triangle and in this instance comprises a hub 23 having a screw threaded connection with the under side of the chambered base 1. The hub has a spindle 24 threaded therein and carries at its lower end a nut 25 to take care of the lost motion between the spindle 24 and the hub 23. A shoulder 26 is provided at the lower part of the spindle against which a knurled sleeve 27 is held by a lock nut 28. On the outer end of the spindle 24 a short extension 29 is provided. This extension preferably is hardened and ground perfectly flat on its extreme lower end so that the instrument may be supported from this ground surface. The pitch of the spindle screw graduations, etc., may be constructed so as to obtain any reading desired, such as one one-thousandth of an inch reading, as in any micrometer.

Adapted to be combined with the measuring means of the instrument are a number of measuring extensions 30 each of which is in the form of a short rod of circular cross section having its opposite ends perfectly flat, one end being adapted to cooperate with the flat surface on the extension 29 while the other end is adapted for cooperation with the object to be measured. To hold the extension rods 30 to the extension 29 a chuck may be provided preferably in the form of a sleeve 31 having a split 32 at one end and adapted to fit at its split end about the extension 29. A nut 33 serves to clamp the sleeve on the extension. The other end of this sleeve is provided with longitudinal slits 34 and is tapered exteriorly while at the same time being provided with screw threads 35 above the tapered portion. A nut or collar 36 turns on the screw portion 35 and has an internal taper 37 adapted to cooperate with the external taper on the sleeve for the purpose of forcing the sleeve firmly against the extension rod 30 received within the sleeve. Extension rods 30 are, in this instance, of one to five inches in length and the micrometer has a one-inch adjustment. This embodiment is designed for any reading between zero and six inches. For reading between five and six inches the instrument is used without any extension 30; between four and five inches the one inch extension rod is secured to the spindle extension 29; for readings between three and four inches the two inch extension rod is used; for readings between two and three inches the three inch extension rod is used; for readings between one and two inches the four inch extension rod is used, and for readings between one inch and zero the five inch extension rod is used. When the five inch extension rod is in place and the micrometer sleeve is at its zero point, the bottom surface or free end of the extension rod will lie at the focal point of the instrument or the crossing of the optical axes of the two view openings.

In the embodiment of the invention shown in Fig. 7, the measurement is made in the angle beyond the focal point 4. The prisms 6$^a$ at the view openings 2$^a$ are 90 degrees so that an axial ray entering the prisms will be directed to the trapeze prisms 7ª which are formed like the trapeze prisms of the other embodiments. The measuring means is constructed like that shown in Fig. 1 except that the plane surface on the extension 29ª lies at the focal point of the instrument when the measuring device is at zero. The extensions such as shown in Fig. 3 together with the clamp shown in Fig. 5 may be used in connection with the measuring device so as to throw the bearing point at any desired distance from the focal point 4. The use of this form of the invention is the same as that shown in Fig. 1 except that the base $a'$ of the triangle formed by the optical rays 3 lies beyond the focal point 4 and the effective portion of the perpendicular 5 lies also beyond such focal point.

In Figs. 8 to 15 inclusive there has been illustrated a number of different methods of using this embodiment of the instrument. In Fig. 8 the instrument is shown as adjusted for measuring a piece of round stock which is assumed to be six inches in diameter. The lower end of the extension 29 is brought in engagement with one side of the stock while the opposite side of the stock is rested upon a flat piece of material $x^1$ with a line $x^2$ marked thereon. The micrometer sleeve 27 is rotated so that the zero point thereon coincides with the index 27ª. In this position the line $x^2$ should be visible in the instrument as a single line as shown in the circle Y, Fig. 8. If the stock is not exactly six inches in diameter, then the line $x^2$ will appear as two lines as shown in the circle Z, Fig. 8. The diameter of the round stock may also be measured in the manner shown in Fig. 9. By bringing the extension 29 in engagement with the end of the stock, the micrometer is adjusted in the same manner as in Fig. 8 and if the stock is exactly six inches, then the opposite edges of the stock will appear to coincide as in the circle $Y^1$ Fig. 9, but if it is less than six inches, then the opposite edges will appear separated as in the circle $Z^1$, or if greater there will be an overlapping of the images.

In Figs. 10 and 11 the instrument is shown as being employed for measuring the thickness of a piece of flat stock. In this illustration, the longest extension rod 30 is employed, being secured by the clamping device to the screw extension 29. The micrometer sleeve 27 is adjusted to correspond to the desired thickness of the material. The stock $x$ is placed upon a plate $x^1$ with the etched line $x^2$ and if the stock be of the desired thickness, the etched line will appear as one line in the circle $Y^2$ Fig. 10 and if it be too thin it will appear as two lines as in the circle $Z^2$ Fig. 10. In Fig. 11 the lower end of the extension rod 30 is brought into engagement with the end of the stock $x$ and the instrument is adjusted as in Fig. 10. If the stock be of the proper thickness the two images will have their opposed edges in coincidence as in the circle $Y^3$ Fig. 11, whereas, if the material be too thin the two images will appear separated as in the circle $z^3$ Fig. 11.

In Fig. 12 the instrument is shown as measuring the distance between two holes drilled in a work piece $x$, the distance between the holes being assumed to be six inches. The micrometer sleeve 27 is adjusted to the zero mark and the lower end of the screw extension 29 is brought to bear against the plate between the two holes. If the distance be correct, the two holes will appear as one as in the circle $Y^4$ Fig. 12, but if the distance is too small, the two holes will appear out of line as in the circle $Z^4$, Fig. 12.

In Fig. 13 the instrument is shown as measuring the diameter of a hole drilled in a work piece $x$. In this illustration as the hole is supposed to be less than an inch, the five inch extension rod 30 is employed with the instrument and the micrometer sleeve 27 is adjusted so as to correspond to the diameter of the hole. If the diameter of the hole be proper, then in the eye piece of the instrument, two circles will be visible with their circumferences intersecting in the manner shown in the circle $Y^5$ Fig. 13. If however, the hole is not of the proper diameter, then the two circles will be out of coincidence as in the circle $Z^5$ Fig. 13.

In all of the adjustments heretofore described, if the work is not accurate the inaccuracy may be determined by adjusting the micrometer sleeve 27 in a proper direction to bring about coincidence by a certain point of the object in both images. However, in some instances, the amount of this inaccuracy is not material as when manufactured parts are to be inspected and checked, and this instrument permits this checking and inspection to be accomplished by any inexperienced person, if the instrument is adjusted by an experienced person in the first instance and is held in this adjusted position. This may be effected by supporting the instrument upon a standard 38 having a clamp 39 at its upper end engaging about the instrument and a work support 40 adjustable on the standard 38 below the instrument. This standard is so adjusted that the work, when placed thereon, will, if correct in measurement, give coincidence but, if incorrect, the coincidence will not be present.

In Fig. 14 the diameter of a round piece of stock $x$ is measured and gives in the circle $y^6$ coincidence by the opposed edges of the two images whereas, if the work is too small, separation of the images will take place as in the circle $z^6$.

In Fig. 15 the diameter of a work piece is measured from the end thereof and will give coincidence as in the circle $y^7$ if the work is correct and separation of the images as in the circle $z^7$ if the work is too small. For inspection work, the instrument may be provided with a small glass scale mounted in the focal plane of the eye piece combination and having a limit line thereon for parts over and under size.

In Figs. 16 and 17 the instrument is illustrated for measuring the depth of a hole $x^4$ in a solid piece of rod and for measuring the diameter of an inner hole at the center and bottom of the first named bore. The depth of the main bore is first taken by scratching a fine line $x^5$ on the bottom of the main bore. The micrometer extension is brought to rest upon any suitable device such as a scale $x^6$ placed across the top of the bore. The coincidence of the scratched line is then obtained and the micrometer gives the depth of the bore plus the thickness of the scale or support. Assuming that the depth of the bore plus the thickness of the scale reads 98 hundredths of an inch on a micrometer sleeve, the diameter of the inner center hole $x^7$ is obtained by adjusting the instrument until the two edges of the hole are in coincidence as shown in $y^9$ Fig. 17. If the micrometer sleeve reads one inch plus the scale, then this proves that the difference between the first reading of 98 hundredths of an inch and a second reading, which is one inch, is the correct diameter of the center hole, namely, two hundredths of an inch. As illustrated in Fig. 17 the instrument is used with a lower section of the optical rays beyond the crossing point of the axes which of course, is equal to the upper rays. In other words, the instrument can be raised or lowered, say for example, 25 thousandths of an inch to bring a piece of stock of 25 thousandths of an inch in diameter into coincidence. The use of the lower optical rays is one of the many features of the instrument.

While a number of different uses of the invention are herein shown and described, it is apparent that many other uses will suggest themselves and it is not intended by these illustrations to in any way limit the invention.

From the foregoing it will be seen that there has been provided an optical instrument with two view openings, the optical axes of which are arranged to intersect the focal point of the instrument to form two equal angles which are such that a base line connecting said optical axes at any distance from either side of the focal point and at right angles to the perpendicular of the triangle thus formed, will have a length equal to the perpendicular. In this way either the perpendicular or the base may be utilized for measuring purposes.

What I claim as my invention and desire to secure by Letters Patent is:

1. An optical instrument of the type described comprising two optical means for providing two images of a single object, the optical axes of which are relatively fixed and are arranged to intersect at the focal point of the instrument to form two equal angles which are such that a base line connecting said axes at any distance from either side of the focal point and at right angles to the perpendicular of the triangle thus formed will have a length equal to such perpendicular.

2. An optical instrument of the type described comprising two optical means for providing two images of a single object, the optical axes of which are relatively fixed and are arranged to intersect at the focal point of the instrument to form two equal angles which are such that a base line connecting said axes at any distance from either side of the focal point and at right angles to the perpendicular of a triangle thus formed will have a length equal to such perpendicular, and collecting means for bringing together the two images of an object located at the focal point.

3. An optical instrument of the type described comprising two optical means for providing two images of a single object, the optical axes of which are relatively fixed and are arranged to intersect at the focal point of the instrument to form two equal angles which are such that a base line connecting said axes at any distance from either side of the focal point and at right angles to the perpendicular of a triangle thus formed will have a length equal to such perpendicular, collecting means for bringing together two images of an object located at the focal point, and a telescope associated with said collecting means.

4. An optical instrument of the class described comprising two optical means for providing two images of a single object, the optical axes of which are relatively fixed and are arranged to intersect at the focal point of the instrument to form two equal angles which are such that a base line connecting said axes at any distance from the focal point and at right angles to the perpendicular of the triangle thus formed will have a length equal to such perpendicular, collecting means for bringing together two images of an object located at the focal point, and means for measuring the amount the images are out of coincidence without changing the fixed relation between the optical axes.

5. An optical instrument of the class described comprising two image reflecting prisms, the optical axes of which are relatively fixed and are arranged to intersect at the focal point of the instrument to form two equal angles which are such that a base line connecting the axes at any distance from the focal point and at right angles to the perpendicular of the triangle thus formed will have a length equal to such perpendicular, two trapeze prisms associated with such prisms to bring together two images of an object located at the focal point of the instrument, and a telescope associated with the trapeze prisms and having its objective provided with an area equal to the surfaces of the trapeze prisms opposed to such objective.

6. An optical instrument of the class described comprising two optical means for providing two images of a single object, said means having their optical axes relatively fixed and arranged to intersect at the focal point of the instrument to form two equal angles which are such that a base line connecting the axes at any distance from the focal point and at right angles to the perpendicular of the triangle thus formed will have a length equal to such perpendicular, and two trapeze prisms arranged to bring together two images of an object located at the focal point of the instrument.

7. An optical instrument of the class described comprising two optical means for providing two images of a single object, said means having their optical axes relatively fixed and arranged to intersect at the focal point of the instrument to form two equal angles which are such that a base line connecting the axes at any distance from the focal point and at right angles to the perpendicular of the triangle thus formed will have a length equal to such perpendicular, two trapeze prisms arranged to bring together two images of an object located at the focal point of the instrument, and a telescope associated with said trapeze prisms and having its objective provided with an area equal to the surfaces of the trapeze prisms opposed to the objective, said telescope having a diaphragm at the focal plane of its eye piece combination to give a circular form to the ocular field.

8. An optical instrument comprising two reflecting prisms, the optical axes of which are relatively fixed and are arranged to intersect at the focal point of the instrument to form two equal angles which are such that a base line connecting the axes at any distance from the focal point and at right angles to the perpendicular of the triangle thus formed will have a length equal to such perpendicular, two trapeze prisms bringing together two images of an object located at the focal point of the instrument, and a telescope arranged so that both images received from the first mentioned prisms are projected by the objective lens to the focal plane of such lens, the area of the objective lens being equal to those faces of the trapeze prisms opposed to the objective.

9. An optical instrument comprising two image reflecting prisms, the optical axes of which are relatively fixed and are arranged to intersect at the focal point of the instrument to form two equal angles which are such that a base line connecting the axes at any distance from the focal point and at right angles to the perpendicular of the triangle thus formed will have a length equal to such perpendicular, two trapeze prisms bringing together two images of an object located at the focal point of the instrument, and a telescope arranged so that both images received from the prisms are projected by the objective lens to the focal plane of such lens, the area of the objective lens being equal to those faces of the trapeze prism opposed to the objective, and such telescope also having a diaphragm arranged in the focal plane of its eye piece combination to give a circular form to the ocular field.

10. An optical instrument of the class described comprising two optical means for providing two images of a single object, the optical axes of which are relatively fixed and are arranged to intersect at the focal point of the instrument to form two equal angles which are such that a base line connecting the axes at any distance from the focal point and at right angles to the perpendicular of the triangle thus formed will have a length equal to such perpendicular, collecting means for bringing together two images of an object located at the focal point of the instrument, and measuring means for measuring the amount such images are out of coincidence, said measuring means being adjustable in the direction of the perpendicular of the triangle.

11. An optical instrument of the class described comprising two optical means for providing two images of a single object, the optical axes of which are relatively fixed and are arranged to intersect at the focal point of the instrument to form two equal angles which are such that a base line connecting the axes at any distance from the focal point and at right angles to the perpendicular of the triangle thus formed will have a length equal to such perpendicular, collecting means for bringing together two images of an object located at the focal point of the instrument, and measuring means for measuring the amount such images are out of coincidence, comprising a portion adapted for engagement with the object to be measured, and a screw member by which said portion is carried adjustable in the direction of the perpendicular of the triangle.

12. An optical instrument of the class described comprising two optical means for providing two images of a single object, the optical axes of which are relatively fixed and are arranged to intersect at the focal point of the instrument to form two equal angles which are such that a base line connecting the axes at any distance from the focal point and at right angles to the perpendicular of the triangle thus formed will have a length equal to such perpendicular, collecting means for bringing together two images of an object located at the focal point of the instrument, and measuring means for measuring the amount such images are out of coincidence, said measuring means comprising a screw adjustable in the direction of the perpendicular of the triangle, a clamp connected to said screw, and a rod secured in said clamp.

JOSEPH MIHALYI.